Patented Oct. 2, 1928.

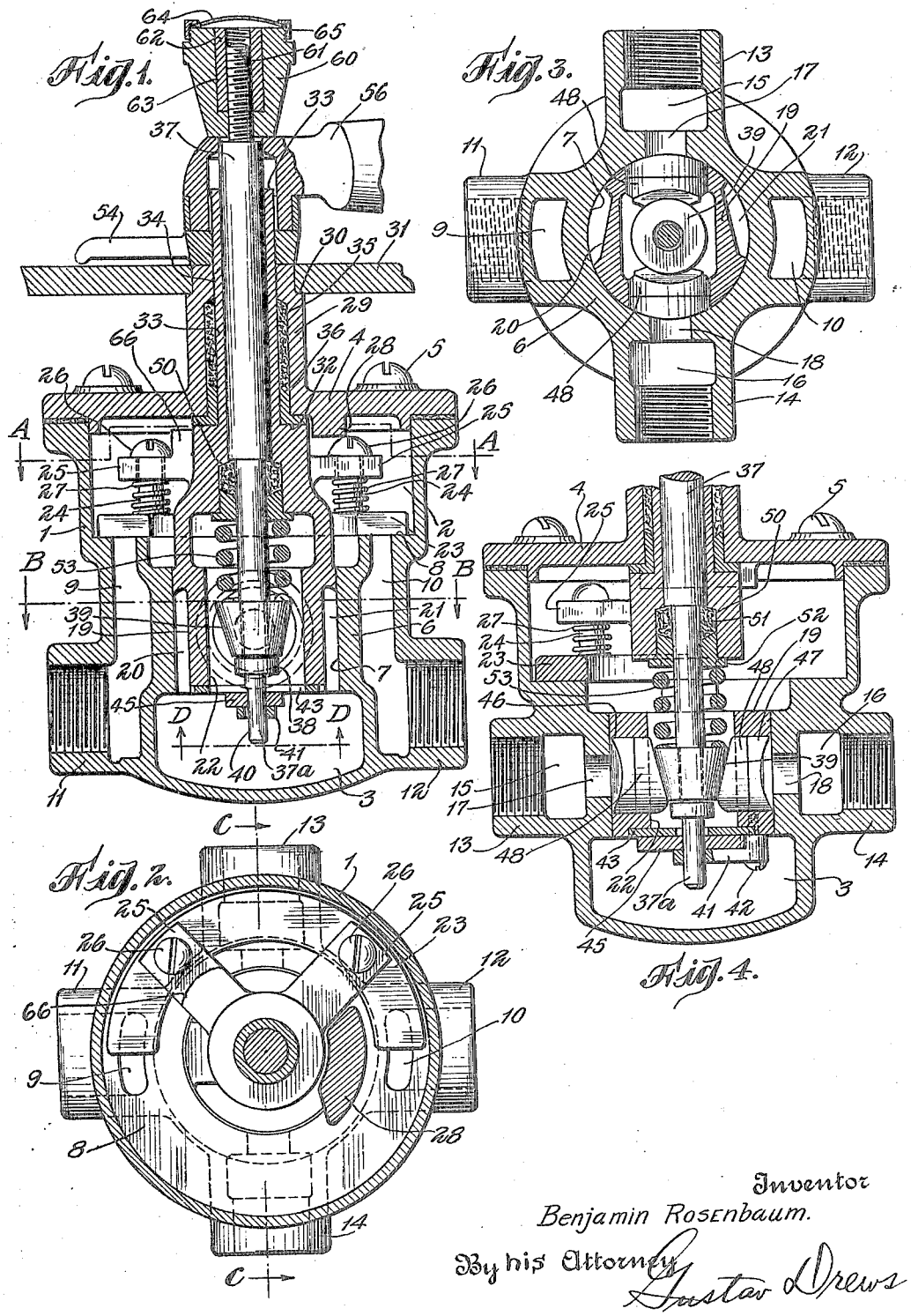

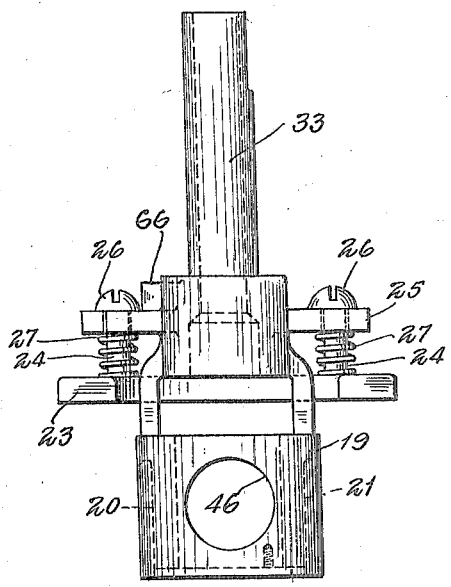
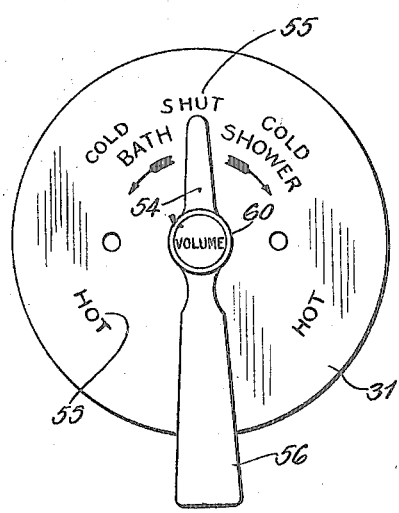
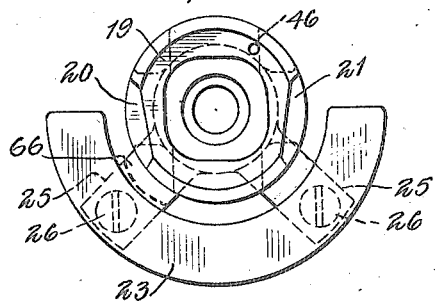
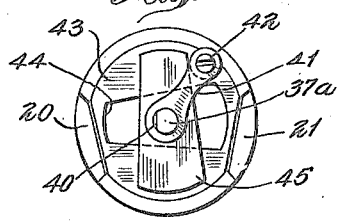
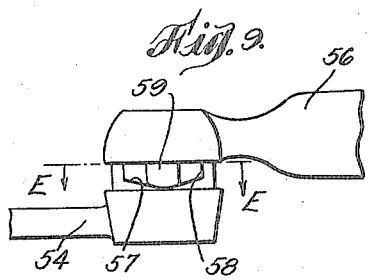
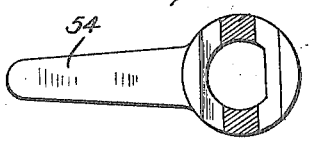

1,685,867

UNITED STATES PATENT OFFICE.

BENJAMIN ROSENBAUM, OF NEW YORK, N. Y.

FLUID-MIXING VALVE.

Application filed January 15, 1926. Serial No. 81,359.

This invention relates to valves, more particularly to improvements in valves for mixing a plurality of fluids in desired proportions, such as mixing hot and cold water for baths, and is in the nature of an improvement upon the valve device disclosed and claimed in my prior copending application, Serial No. 40,742, filed July 1, 1925.

In this type of valve, it is customary to employ packing means for tightly closing the ports of the valve seat and, if tight contact is created between the packing means and the valve seat, the valve is made undesirably difficult to operate. In my said prior application I disclose and claim a construction in which the valve element is automatically loosened in its seat during each operation in order that the valve may turn easily.

An object of this invention is to improve and simplify valves of this general type and obtain a construction in which the valve element may be more readily and easily manipulated; which will always afford a tight shut-off for ingoing fluids; and with which the packing means may be very easily replaced.

A further object of the invention is to provide an improved valve construction which will permit practically complete drainage of the fluid from the valve casing when in "off" position; and which will be relatively simple, durable, compact and inexpensive.

Various other objects and advantages will be apparent from the following description of an embodiment of the invention, and the novel features will be particularly pointed out hereinafter in connection with the appended claims.

In the accompanying drawing:—

Fig. 1 is a longitudinal sectional view through a valve constructed in accordance with this invention;

Fig. 2 is a sectional view of the same, with the section taken substantially along the line A—A of Fig. 1;

Fig. 3 is another section plan of the same, with the section taken approximately along the line B—B of Fig. 1;

Fig. 4 is a sectional view of part of the same, with the section taken transversely of the structure in the position shown in Fig. 1, and approximately along the line C—C of Fig. 2;

Fig. 5 is an elevation of the valve element removed from the casing;

Fig. 6 is a bottom plan of the same;

Fig. 7 is a view of the dial and operating means of the valve device;

Fig. 8 is a bottom plan of the valve element showing the volume control sub-valve thereof, the construction being shown as viewed from the line D—D of Fig. 1;

Fig. 9 is a side elevation of the operation means for the valve element; and

Fig. 10 is a sectional plan of the same, with the section taken approximately along the line E—E of Fig. 9.

In the illustrated embodiment of the invention, the main valve casing 1 is divided into upper and lower compartments 2 and 3, the lower compartment 3 being permanently closed by the bottom wall of the casing and the upper compartment 2 being closed by a removable cap 4 which may be secured in position thereon in any suitable manner such as by screws 5.

The casing 1 is provided with an internal wall 6 having a passage 7 which connects the two compartments 2 and 3. The wall 6, at the point where it enters the compartment 2, is shouldered as at 8 to form a valve track for a purpose which will appear shortly. The casing wall is provided with two conduits 9 and 10 which open into the upper compartment 2 through openings in the shoulder or track 8, and terminate in bosses 11 and 12 which are threaded for connection to pipes extending to distributing points, such as to the shower and tub fixtures when the valve is employed in connection with bath fixtures.

The casing is also provided with tubular bosses 13 and 14 which are disposed diametrically of one another between the bosses 11 and 12 and these bosses 13 and 14 are also threaded for connection to pipes leading to sources of supply of the fluid, such as to supplies of hot and cold water when the valve is employed in connection with bath room installations. The interiors of the bosses 13 and 14 are connected by conduits 15 and 16 respectively, to ports 17 and 18 in the wall 6 which defines the passage 7 between the upper and lower compartments, the lateral wall of the passage 7 serving as a valve seat having the two ports 17 and 18 opening therethrough at angularly spaced or diametrically opposite points. A valve element 19 is disposed within and substantially fills the passage 7 between the compartments and is rotatable therein.

The valve element 19 is provided in its peripheral surface with two channels or depressions 20 and 21 which extend from approximately the level of the ports to the end which is at the junction between the passage 7 and the compartment 3. Thus it will be observed that when the valve element is angularly adjusted in the valve seat so as to carry either channel 20 or 21 into communication with either port 17 and 18, communication will be established between such port and the compartment 3, and any fluid from the source, entering through the bosses 13 and 14, will enter the compartment 3 as permitted by the valve element.

The two channels 20 and 21 of the valve element are provided therein preferably at points which are less than 180° apart, so that when rotated in either direction from the normally closed position shown in Fig. 3, a channel of the valve element will communicate with one of the ports prior to the communication with the other channel of the other port. Thus by adjusting the valve element through the desired extent, the channels 20 and 21 may be placed in communication with either port selectively or in communication with both by variable adjustments of the valve element.

The valve element 19 is also provided with a channel 22 which extends in a direction lengthwise thereof from its end where it communicates with the compartment 3 to a point where the valve element enters the upper compartment 2. The opening between the channel 22 and the upper compartment 2 is effected through the side wall of the valve element. Thus any fluid entering the compartment 3 may pass through the valve element into the upper compartment 2, and thence through either passage or conduit 9 or 10 to the distributing bosses 11 and 12 as will be explained shortly.

An arcuate valve plate 23 is disposed upon the shoulder or track 8, so as to slide thereon, and carries studs 24 which extend from a face thereof toward the cap 4 of the casing. The studs 24 pass slidably through apertures in arms 25 that extend outwardly from the valve element 19, and terminate at their upper or free ends in heads 26. Suitable compression springs 27 are disposed around the studs and act between the heads 26 and the plate 23 to press the latter yieldingly against the track 8 while being angularly adjusted with the valve element during rotation of the latter. Headed machine screws may be employed satisfactorily as the studs 24. Preferably a lug 28 extends from the cap 4 of the casing into the compartment 2 within the path of travel of the lug 66, so as to limit the angular adjustment of the valve element to the desired extent.

The cap 4 of the casing is provided with a tubular outward extension 29 which is adapted to pass through the wall on which the valve device is to be supported, and at a suitably spaced distance from the outer face of the cap is provided with a shoulder 30 against which a dial plate 31 is fitted. The outer end of the tubular extension 29 may terminate flush with the outer or upper face of the dial plate 31 as shown clearly in Fig. 1. The valve element 19 is provided with a shoulder 32 at a point adjacent the inner face of the cap 4 and then is provided with a reduced sleeve-like extension 33 which passes through the tubular extension 29 and for some distance beyond the outer end of the tubular extension as also shown clearly in Fig. 1.

The tubular extension 29, for the greater portion of its length from the inner face of the cap piece 4, is somewhat larger in its interior than the diameter of the sleeve-like portion 33, but at its outer end is contracted or restricted to provide a bearing surface 34 for the outer end of the sleeve-like portion 33 of the valve element. The interior of the tubular extension 29 below the bearing section 34 thereof is filled with a suitable packing substance 35 which is confined therein by a sleeve-like gland 36 that is inserted into the tubular extension from its lower end. The gland 36 is provided at its lower end with an external flange which abuts against the inner face of the cap 4 and against the shoulder 32 of the valve element.

A spindle 37 is rotatably mounted in the sleeve-like extension 33 so as to extend outwardly beyond the outer end thereof and extends inwardly through the channel 22 of the valve element and into the compartment 3 of the lower part of the casing. The spindle is provided at a point within the channel 22 with a collar 38 against which rests a frustocone or wedge element 39 the wedge element being preferably mounted on a reduced section 37ª of the spindle so as to be capable of a somewhat limited movement on the spindle between the shoulder and the collar 38.

Below the collar 38 the spindle is flattened upon one face as at 40. This non-circular portion is rotatably mounted in a bracket arm 41 which extends across the opening of the channel 22 from the lower end of the valve element 19, the bracket arm being secured to the lower face of the valve element in any suitable manner, such as by a screw 42.

A plate 43 is disposed across the inner end of the valve element and preferably is countersunk flush into the end of the same so as to bridge the passage 22. The plate 43 is provided with an aperture 44 which serves as a port for a sub-valve element controlling the passage of fluid between the two compartments. A sub-valve element 45 is provided upon the flattened or non-circular portion of the spindle between the arm 41, which rotatably supports the inner end of the spindle, and the plate 43.

The sub-valve element 45 fits closely against the plate 43 and has a shape similar to the aperture 44 except that it is slightly larger, so that when the sub-valve element 45 is positioned over the aperture 44 and in a similar position thereto, it will overlap the periphery of opening 44 and completely close the passage 22 through the valve element. By rotation of the spindle, the sub-valve element 45 may be rotated into different angular positions to uncover, to different extents, the opening 44 and thus variably control the passage of fluid between the two compartments.

The element 45 preferably has an aperture which conforms in size and shape to the non-circular portion of the spindle over which it fits, so as to be rotatable with the spindle in both directions and also permit separate endwise relative movement of the spindle.

The valve element 19 is provided with apertures or openings 46 which extend from the passage 22 radially of the valve seat, and packing means 47 in the form of buttons of packing material are mounted in the apertures or openings 46 so as to be movable radially toward and from the valve seat. Any suitable packing material commonly used in valve structures or suitable for that purpose may be employed, such as the various fibre and rubber compositions in common use for that purpose.

Buttons 48 are also mounted in the apertures behind the packing buttons, so as to bear against the latter, and are of a length or thickness sufficient to extend into the passage 22. The inner end faces 49 of these buttons 48 are inclined to the axis of the spindle so as to converge toward one another and toward the inner end of the spindle, the inclination to the axis of the spindle being somewhat similar to the convergence of the frusto-conical surface of the wedge. Thus, when the wedge is forced downwardly toward the compartment 3, it will force the backing buttons 48 outwardly and, through them force the packing buttons outwardly and into tight contact with the valve seat, so as to tightly close the ports 17 and 18 when the valve element 19 is in closed position as shown in Figs. 3 and 4.

In order to prevent leakage along the spindle, the valve element may be provided with an internal chamber 50 through which the spindle passes, which chamber is filled with a suitable packing material 51, the chamber being closed and the packing compressed by a suitable gland element 52. A helical compression spring 53 surrounds the spindle within the valve element 19, so as to abut at one end against the valve element or the packing gland 52, and at its other end against a base or end face of the wedge 39, so as to be under compression and normally urge the spindle inwardly and yieldingly force the wedge between the buttons 48 and thus yieldingly force the packing means firmly into contact with the valve seat. It will be observed, however, that when the spindle is shifted upwardly or outwardly, the wedge will be drawn upwardly and the spring 53 further compressed, thus relieving the packing means of the pressure of the spring 53 which permits easy operation of the valve element.

An arm 54, serving as an indicator, is fixed upon the outer end portion of the reduced section 33 of the valve element and in close proximity to the dial plate 31, so that the arm 54 will turn with the valve element and by cooperation with suitable words or characters 55 provided upon the dial face, indicate the operative position of the valve element at all times. An operating handle 56 is fitted over the outer end of the spindle 37 and also over the outer end of the valve extension 33, being rotatably mounted upon the same.

The arm 54 is provided upon its upper face with one or more cam slots 57, the bottom wall of each of which inclines upwardly in both directions from an intermediate point and terminates in end abutments or walls 58. The handle 56 is provided with one or more depending cam elements 59 which ride in the cam slots 57, the cam elements 59 and the slots 57 serving as a sort of lost motion connection between the operating handle 56 and the arm 54 which is fixed to the valve element. Whenever the handle 56 is rotated in either direction, the cam elements 59 will ride up the inclined bottom walls of the slots 57 and thus force the handle 56 during its initial movement in a direction axially of the spindle until the cam elements 59 abut against the end walls 58 of the slots, whereupon the arm 54 will be turned with the operating handle 56.

The operating handle is confined upon the spindle 37 by a button 60, which is threaded upon a reduced threaded end 61 of the spindle and locked thereon in any suitable manner, such as by a locking nut sleeve 62 which is also threaded upon the outer end of the spindle and received in a recess 63 in the outer face of the button 60. The button is fitted closely against the outer face of the handle 56, so that whenever the handle 56 is shifted endwise as just described, the spindle 37 will also be shifted endwise to compress the spring 53 and remove the wedge from between the buttons 48 and thus relieve the pressure on the packing elements.

The button 60 also serves as a means by which the spindle may be rotated in order to shift the sub-valve element 45 to different angular positions over the opening 44 in the valve element, and thus control the passage of fluid between the two compartments. A suitable plate 64 may be confined against the outer face of the button 60 to conceal the locking nut 62, the periphery of the plate 64 being confined to the button by an annular retaining ring 65 which is threaded upon the outer end of the button. The ring 65 has an internal flange overlying the periphery of the plate 64, which may be convex as shown, and carry a suitable designation such as the word "Volume" to indicate that the button controls the volume of liquid which passes through the valve device.

In the use of a valve constructed as above described, the casing may be mounted in a wall with the tubular boss 29 extending through the wall and supporting the dial plate 31 against the face of the wall, so that the casing of the valve will be concealed within the wall, and the indicating arm, the operating handle 56, and the volume control button 60 all exposed for manipulation and observation. Assuming that the valve device is utilized in bath room installations, the boss 11 may be connected by a pipe to the shower fixture, and the boss 12 may be connected by a pipe to the tub fixture. The boss 13 may be connected to a source of hot water and the boss 14 may be connected to a source of cold water.

The hot and cold water will enter the casing through the boss connections 13 and 14, but will normally be prevented from entering the interior of the casing by the valve element 19 which closes the ports 17 and 18. The packing elements 47 will always wear so as to conform to the surface of the valve seat and will be tightly wedged over the ports by the wedge 39 and the spring 53. In this "off" position, the arm 54 will be in the position shown in Fig. 7, for example, and indicate upon the dial 31 that the valve is shut. The volume control button 60 may be left in any desired position.

If now it is desired that a suitable mixture of hot and cold water be admitted to the shower, the valve handle 56 is grasped and manipulated in a clockwise direction as viewed in Fig. 7. During the initial movement of the handle 56, the cam elements 59 (see Fig. 9) will ride up the inclined bottom walls of the cam slots 57 and shift the spindle endwise to relieve the pressure on the packing means and immediately thereafter the cam elements 59 will engage with ends of the slots 57 and turn the arm 54, and through it the valve element in a direction to carry the channel 20 of the valve element into alignment with the port 17 and upon further movement also carry the channel 21 into alignment with the port 18.

By varying the angular extent through which the valve element is turned in this manner, the relative proportions of the channels 20 and 21 which uncover the ports 17 and 18 will determine the relative amounts of hot and cold water which will pass through the channels into the lower compartment or mixing chamber 3. The handle 56 is turned in this manner until the desired temperature of water is obtained and then the volume control button 60 may be turned until the desired volume of water passing through the fixture is obtained. When the handle 56 is turned clockwise from the "off" position shown in Fig. 7, the valve element will also carry the arcuate valve plate 23 over the track 8, and in so moving, this plate 23 will completely cover the opening through the shoulder or track 8 from the conduit 10 and completely uncover the opening through the track 8 from the conduit 9.

The mixed water in the lower compartment or mixing chamber 3 passes through the passage of the valve element 19 and into the upper distributing compartment 2 and thence through the uncovered opening in the track 8, through the conduit 9, and thence to the shower fixture. In order to shut off the water to the shower fixture, it is merely necessary to turn the handle 56 in the reverse direction to carry the indicating arm 54 to the shut position shown in Fig. 7. In this position, as explained hereinbefore, the plate 23 which runs on the shoulder or track 8 will only partially cover the openings to the two conduits 9 and 10 and, therefore, any water which is held or trapped in the pipe leading from the valve casing to the shower fixture may drain back through the conduit 9 into the compartment 2, and thence through the other conduit 10 to the bath fixture which is open and usually lower than the shower fixture.

In order to utilize the bath tub, the handle 56 is manipulated in a counterclockwise direction from the position shown in Fig. 7, during which the spindle will first be shifted endwise to relieve the pressure on the packing means and thus facilitate the operation of the valve element, and then the valve element will be turned in the reverse direction to carry the channel 21 into alignment with the port 17, and upon still further movement to carry the channel 20 into alignment with the port 18. By varying the angular position of the valve element in this manner, the desired proportions of hot and cold water which will be admitted to the lower chamber 3 may be determined and varied, and the volume controlled by the button 60 as before.

During this movement of the valve element the plate 23 will be carried in the reverse direction so as to immediately close and maintain closed, the opening to the conduit 9 leading to the shower fixture, and to completely uncover the opening to the conduit 10 which leads to the bath fixture. Thus the water of the desired temperature and volume will pass to the bath fixture instead of to the shower.

The passage of the water to the bath fixture may be cut off by returning the arm 54 to the "shut" position as shown in Fig. 7 through suitable manipulation of the handle 56. It will also be noted that after such an operation, the plate 23, as explained, will uncover the opening to both conduits 9 and 10, and thus by admitting air through the shower fixture to the valve casing the water trapped in the conduit 10 and pipe leading to the bath fixture may drain through the bath fixture. The lug 28 depending into the casing and co-operating with the valve element arms 25, serves to limit the desired range of operation of the valve element as shown by the dial.

It will be obvious that various changes in the details, which have been herein described and illustrated for the purpose of explaining the nature of the invention, may be made by those skilled in the art within the principle and scope of the invention as expressed in the appended claims.

I claim:—

1. In a valve device, a casing having a valve seat with a port in said seat, a valve mounted in the casing and movable on said seat to control the passage of fluid through said port, packing means movably carried by the valve and closing the port when the valve is in "off" position, means normally pressing said packing means against the seat, an operating element connected to said valve and operable automatically upon an opening movement of the valve away from "off" position for first operating said pressure means to release said packing means and then rotating said valve to open said port.

2. In a valve device, a casing having a ported seat, a valve cooperating with said seat and movable to open and close a port, packing means movably carried by the valve and cooperating with the seat to close a port tightly when in closed position, means for yieldingly pressing said packing against said seat, and means effective upon said pressure means for releasing the pressure upon said seat preparatory to movement of said valve.

3. In a valve device a casing having a ported valve seat, a valve element cooperating with said seat and movable to open and close said port, packing means carried by the valve and cooperating with the seat to close the port tightly when in closed position, a wedge device normally urging said packing means into contact with the seat to tightly close said port, and operating means for said valve element connected to said wedge means for releasing said packing means during movement of the valve.

4. In a valve device, a casing having a seat provided with a plurality of ports, a valve element cooperating with said seat and movable to open and close said ports, packing means carried by the valve element and moving into contact with said seat to tightly close the port when in closed position, a spindle passing through said valve element and having a wedge thereon, means normally and yieldingly urging the spindle in a direction to wedge the packing means tightly against the seat, means for operating the valve element having a cam connection to said spindle for shifting it in a direction to release the wedging action upon the packing means during the movement of said operating means.

5. In a valve device, a casing having a valve seat provided with a plurality of ports, a valve element fitting said seat and having apertures therein, packing gaskets disposed in said valve apertures to move toward and from the valve seat, a wedge device disposed in said valve element for wedging said packing elements tightly against the seat, a spring device for yieldingly urging said wedge device in a direction to effect said wedging action, valve operating means, and means controlled by the valve operating means for operating said wedge device against the action of the spring to release the packing elements during movements of the valve.

6. In a valve device, a casing having a passage the lateral wall of which serves as a valve seat and having a port therein, a valve element fitting said passage and rotatable therein about the longitudinal axis of the passage, a packing element movably carried by said valve and covering said port when the valve is in closed position, resilient means for urging said packing element against the valve seat to tightly close said port, means for operating the valve element, and means operated by the last named means for releasing the pressure on said packing element during the movement of said valve.

7. In a valve device, a casing having a ported seat, a valve element cooperating with said seat and movable to open and close said port, a packing element movable relative to the valve element carried by the valve element and covering said port when the valve element is in closed position, means yieldingly urging the packing element into contact with the seat, means for operating said valve element, and means controlled by the last named means for releasing the pressure on said packing element during the valve element movements.

8. In a valve device, a casing having a passage, the lateral wall of which serves as the valve seat, a valve element fitting said passage and cooperating with said seat, said lateral wall having a plurality of ports therein, said valve element having depressions in its outer surface for cooperating with said ports to pass a fluid when said depressions are adjacent the ports, packing elements carried by said valve element in the surface portions between said depressions and movable radially toward and from the valve seat, a wedge element disposed between said packing elements, spring means for normally urging said wedge element in a direction to force the packing elements against the valve seat, means for operating the valve element, and means controlled by the last named means for shifting the wedge element in a direction to release the packing elements during movement of the valve element.

9. In a valve device, a casing having a passage, the lateral wall of which serves as a valve seat and having ports therein, a valve element filling said passage and cooperating with said seat, said valve element having depressions in its surface cooperating with said ports to permit passage of a fluid from the ports when a depression is adjacent any port, packing elements carried by said valve element and movable radially toward and from the valve seat, a wedge element in said valve element between said packing elements, a spring device for normally urging said wedge element in a direction to force said packing elements tightly against the seat, means for operating said valve element, and means controlled by the last named means for shifting the valve element against the action of the spring to release the pressure on said packing elements during movements of the valve.

10. In a valve device, a casing having a valve passage, the lateral wall of which serves as a seat and having a plurality of ports therein, a valve element filling said passage and cooperating with said seat, said valve element having sub-passages cooperating with the ports when brought adjacent the same to permit the passage of a fluid through said ports, a spindle passing through said valve element in a direction parallel to the axis of said passage, packing means movable relative to said valve element and carried by said valve element between said valve element sub-passages for normally closing said ports when the valve element is in "off" position, means in said valve element and controlled by said spindle for normally pressing said packing means against the valve seat, valve operating means, and a connection between said last named means and the spindle for effecting a release of the pressure on said packing means during operation of the valve element.

11. In a valve device, a casing divided into compartments connected by a passage, the lateral wall of which passage serves as a valve seat, said valve seat having ports therein, a valve element filling said passage and controlling communication between said ports and one of said compartments, said valve element having a passage lengthwise thereof, a sub-valve device carried by said valve element for controlling the passage therethrough between said compartments, packing means movable relative to said valve element and carried by the valve element and engaging with said valve seat to tightly close the ports when the valve element is in closed position, means for normally forcing said packing means tightly against the valve seat, and means controlled by said sub-valve device for lessening the pressure on said packing means during movements of the valve element.

12. In a valve device, a casing having a pair of compartments connected by a passage, the lateral wall of said passage serving as a valve seat and having ports therein, a valve element filling said passage and cooperating with said lateral wall to control communication between said ports and one of said compartments, depending upon the angular adjustment of said valve element about its longitudinal axis, said valve element having a passage extending in a direction lengthwise thereof between said compartments, a sub-valve controlling said valve element passage, packing means carried by said valve element and cooperating with the valve seat to tightly close said ports when the valve element is in closed position, a spindle carried by said valve element and connected to said sub-valve to operate the same and passing in a direction lengthwise of said valve element passage, a wedge carried by said spindle for normally urging said packing means into contact with the valve seat, a spring device normally urging said wedge element in a direction to increase the pressure on said packing means, means for operating the valve element, and a connection between said last named means and said spindle for shifting the spindle endwise to carry the wedge against the action of the spring in a manner to release the pressure on said packing means during movements of the valve element.

13. In a valve device, a casing having a pair of compartments connected by a passage, the lateral wall of the passage having ports and serving as a valve seat, a valve element filling said passage and having sub-passages which when brought into communication with said ports will establish communication between said ports and one of said compartments, said valve element having a passage extending in a direction lengthwise thereof to provide communication between said compartments, a sub-valve controlling communication through said valve element passage, a spindle connected to said sub-valve to operate the same and extending in a direction axially of the valve element and rotatable independently of the valve element to control the valve passage between said compartments, said spindle being movable endwise in said valve element, packing means movable relative to said valve element and carried by said valve element and cooperating with said valve seat to close the ports when the valve element is in closed position, means for operating said valve element, a connection between said last named means and the spindle for shifting the spindle endwise during operation of the valve, and means controlled by the spindle for urging the packing means tightly against the seat and controlled by the endwise movement of the spindle during movement of the valve element for decreasing the pressure on the packing means.

14. In a valve device, a casing having a passage, a valve element filling said passage, the lateral wall of the passage having ports and serving as a valve seat with which the valve periphery cooperates to control communication between the ports and the interior of the casing, packing means movably carried by said valve element and cooperating with said seat to close the ports tightly when the valve element is in "closed" position, means normally urging the packing means tightly against the seat, and valve operating means effective upon the last named means during movement of the valve element for lessening the pressure on said packing means.

15. In a valve device, a casing having a valve seat, a valve element co-operating with said seat and movable in a horizontal direction relatively thereto, means for normally pressing said element against said seat, means for operating said element between "open" and "closed" positions, and means operatable by said operating means for reducing the pressure of said element upon said seat during operation of said element.

16. In a valve device, a casing having a valve seat, a valve element co-operating with said seat and movable in a horizontal direction relatively thereto, said valve element being further movable relative to said seat between "open" and "closed" positions, means for normally pressing said element against said seat, a dial, an indicator co-operating with said dial and carried by said element for movement therewith, said dial and indicator having co-operating characters by which the position of said element will always be indicated, valve element operating means having a lost motion connection to said element, and means operable by said last named means during its lost motion movement for lessening the pressure of said element on said seat during operation of said element in either direction.

BENJAMIN ROSENBAUM.